US007246595B1

(12) United States Patent
Hoare et al.

(10) Patent No.: US 7,246,595 B1
(45) Date of Patent: Jul. 24, 2007

(54) DIESEL ENGINE WITH DIFFERENTIAL CYLINDER GROUP OPERATION

(75) Inventors: Graham Hoare, Northville, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/427,269

(22) Filed: Jun. 28, 2006

(51) Int. Cl.
*F02B 3/08* (2006.01)

(52) U.S. Cl. .................... 123/294; 123/299; 123/90.15

(58) Field of Classification Search .. 123/90.15–90.18, 123/294–305, 443
See application file for complete search history.

(56) References Cited

U.S. PATENT DOCUMENTS 5,117,790 A 6/1992 Clarke et al.
6,336,436 B1 * 1/2002 Miyakubo et al. ....... 123/90.15
6,735,937 B2 * 5/2004 Sumilla et al. ............. 123/443
6,948,310 B2 9/2005 Roberts, Jr. et al.
6,951,098 B2 10/2005 Xu et al.
2004/0182359 A1 9/2004 Stewart et al.

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

A method for controlling operation of a diesel engine having a plurality of cylinders, the engine including a first group of cylinders and a second group of cylinders, the method comprising of operating the first group of cylinders with a first intake and exhaust valve timing, the first group of cylinders inducting air and performing diesel compression ignition combustion of injected fuel; and operating the second group of cylinders with a second intake and exhaust valve timing, the second group of cylinders inducting air and performing diesel compression ignition combustion of injected fuel, wherein said second intake valve timing is retarded compared to said first intake valve timing or said second exhaust valve timing is advanced compared to said first exhaust valve timing.

15 Claims, 5 Drawing Sheets

DIESEL ENGINE WITH DIFFERENTIAL CYLINDER GROUP OPERATION

BACKGROUND AND SUMMARY

Engines may use various devices to reduce release of regulated emission. For example, engines may use emission control devices that perform various catalytic reactions to reduce release of regulated emissions. However, these devices may be sensitive to temperature, and engine operation may be adjusted to maintain these devices at specific operating temperature. The issue with temperature generation in the engine can be particularly difficult in diesel combustion systems, where increased combustion efficiency results in relatively low exhaust temperature.

One approach to provide increase heating is described in U.S. '790. According to this approach, exhaust heating can be performed where some cylinders are in high load condition, and some cylinders are in an engine braking condition. While such operation may increase exhaust heat, the inventors herein have recognizes that it may be relatively fuel inefficient due to the engine braking operation. Further, the differential torque between the cylinders may produce unacceptable vibration as some cylinders are producing negative torque while some are producing positive torque.

In another approach, described in '098, different power is generated between different cylinder banks, where more heat is provided from the higher power cylinders. However, the inventors herein have recognized that such operation may still provide inefficient heat since the cylinders operating at the lower power level produce relatively low amounts of heat.

The above issues may be addressed via a method for controlling operation of a diesel engine having a first group of cylinders and a second group of cylinders. The method may include operating the first group of cylinders with a first intake and exhaust valve timing, where at least one of the intake and exhaust valve timing is adjusted to a different timing compared with the second group of cylinders. For example, one group may have a more retarded intake valve timing (opening and/or closing) and/or a more advanced exhaust valve timing (opening and/or closing). Further, the cylinders may produce a differential level of combustion torque.

In this way, by using intake retard or exhaust advance on cylinders with less torque, it is possible to have a torque differential and also increase heat from both cylinder groups. In other words, both cylinder groups are able to generate at least some heat, and one group is able to generate increased heat due to operating at increased torque (to balance reduced torque of other group), while the other group is able to generate increased heat due to adjusted valve timing. Further, heat generation can be further enhanced in the other group, for example, by operating with adjusting fuel injection timing, amount, or number of injections. An advantage of such operation is that the cylinders providing less torque can do so without necessarily requiring increased throttling via a throttle in the intake (thus avoiding potentially increased pumping work).

DETAILED DESCRIPTION OF EXAMPLE EMBODIMENT(S) OF THE INVENTION

Figure 1A:
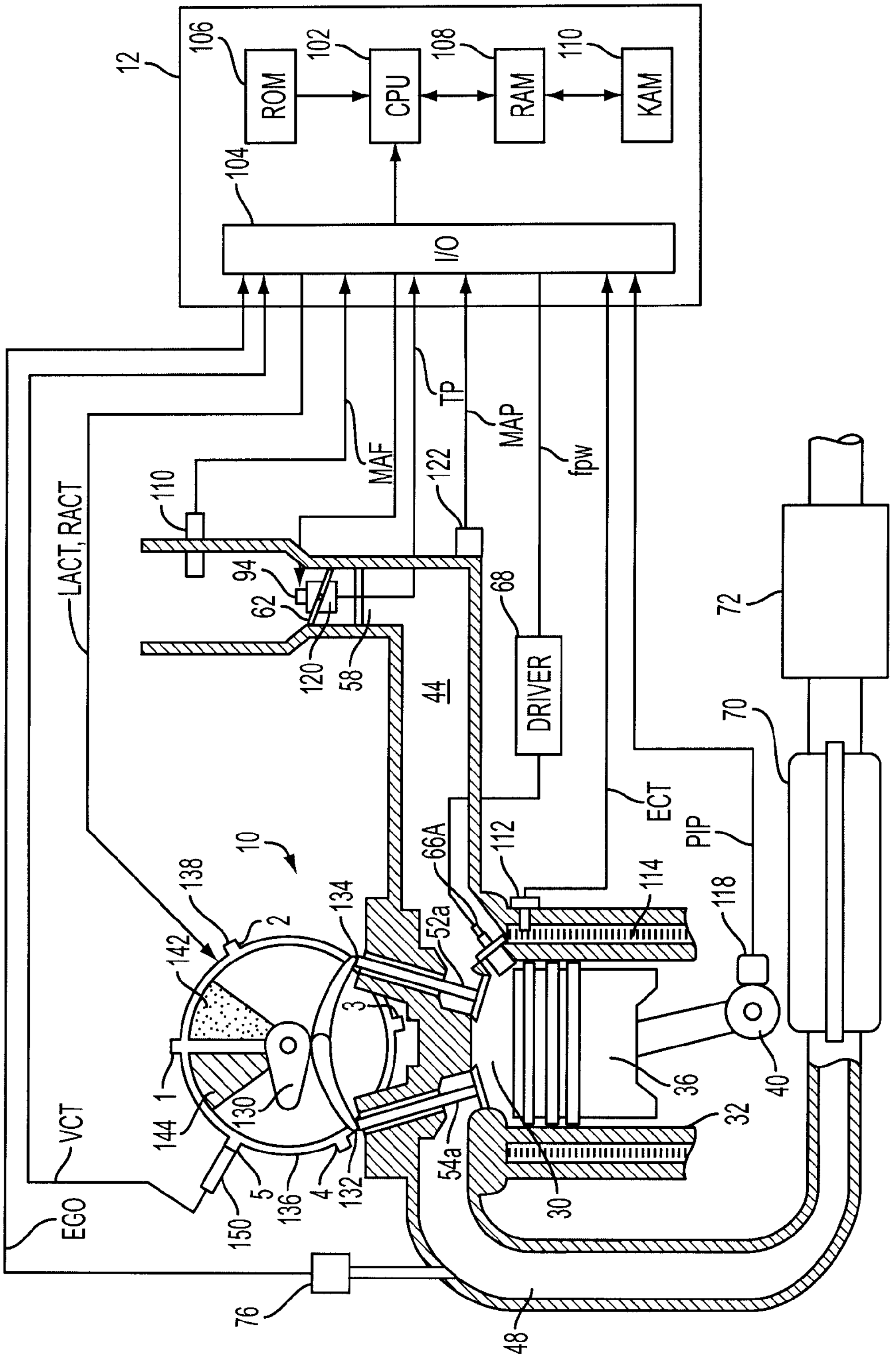
FIG. 1 shows a partial engine view.

FIG. 1 shows one cylinder of a multi-cylinder engine, as well as an intake and exhaust path connected to that cylinder. As described later herein with particular reference to FIG. 2, there are various configurations of the cylinders and exhaust system.

Continuing with FIG. 1, direct injection compression ignition internal combustion engine 10, comprising a plurality of combustion chambers, is controlled by electronic engine controller 12. The engine may be a diesel engine wherein compression ignition is initiated via direct injection of fuel, for example. Combustion chamber 30 of engine 10 is shown including combustion chamber walls 32 with piston 36 positioned therein and connected to crankshaft 40. A starter motor (not shown) is coupled to crankshaft 40 via a flywheel (not shown). Combustion chamber, or cylinder, 30 is shown communicating with intake manifold 44 and exhaust manifold 48 via respective intake valves 52*a* and 52*b* (not shown), and exhaust valves 54*a* and 54*b* (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a high pressure fuel system (not shown) including a fuel tank, fuel pumps, and a fuel rail. For example, a common rail fuel injection system may be used.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94.

Exhaust gas sensor 76 is shown coupled to exhaust manifold 48 upstream of emission control device 70. Sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS.

A second emission control device 72 is shown positioned downstream of device 70. Emission control devices 70 and 72 may be various devices, including particulate filters, NOx catalyst, SCR catalyst, oxidation catalyst, lean NOx traps, etc. In one particular example, a particulate filter may be located upstream of a SCR catalyst, or vice versa.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. In a one example, sensor 118, which is also used as an engine speed sensor, produces a predetermined number of equally spaced pulses every revolution of the crankshaft.

Continuing with FIG. 1, camshaft 130 of engine 10 is shown communicating with rocker arms 132 and 134 for actuating intake valves 52*a*, 52*b* and exhaust valve 54*a*, 54*b*. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52*a*, 52*b* and exhaust valves 54*a*, 54*b* open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52*a*, 52*b*, and exhaust valves 54*a*, 54*b* open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing may be measured in a variety of ways. For example, the time, or rotation angle between the rising edge of the PIP signal and receiving a signal from one of the plurality of teeth 138 on housing 136 can be used as a measure of the relative cam timing. For the particular example of a V-8 engine, with two cylinder banks and a five-toothed wheel, a measure of cam timing for a particular bank is received four times per revolution, with the extra signal used for cylinder identification.

As described above, FIG. 1A merely shows one cylinder of a multi-cylinder engine, and that each cylinder has its own set of intake/exhaust valves, fuel injectors, etc. However, as described in further detail below, cylinders may be grouped, with each cylinder group having common valve timing control via a common camshaft, for example.

Also, in the example embodiments described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling exhaust valve timing. Further still, a turbocharger or supercharger may be used.

Figure 2A:
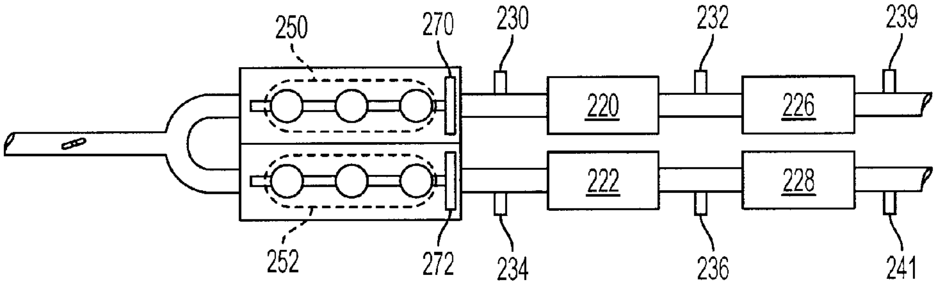
FIGS. 2A-2B show various schematic system configurations.

Referring now to FIG. 2A, a first example configuration is described using a V-6 engine, although this is simply one example, since a V-8, V-10, V-12, I4, I6, etc., could also be used. Note that while several exhaust gas oxygen sensors are shown, a subset of these sensors can also be used. Further, only a subset of the emission control devices can be used, and a either a Y-pipe or non-Y-pipe configuration can also be used.

As shown in FIG. 2A, cylinders of a first combustion chamber group 250 are coupled to the first emission control device 220, and cylinder of a second combustion chamber group 252 are coupled to a second emission control device 222. Note that this is just one example, and that cylinders within a group may be coupled to different emission control devices, or cylinders from different groups may be coupled to a common emission control device.

Upstream of device 220 and downstream of the first cylinder group 250 is an exhaust gas oxygen sensor 230. Downstream of device 220 is a second exhaust gas sensor 232. In this example, groups 250 and 252 each have three cylinders, and each group corresponds to a cylinder bank. However, either group 250 or group 252 could be divided into other groups, and groups may be across cylinder banks, for example.

Upstream and downstream of second device 222 are exhaust gas oxygen sensors 234 and 236, respectively. Further, a first and second downstream emission control devices 226 and 228 are shown downstream of devices 220 and 222, respectively. Alternatively, a Y-pipe configuration may be used to join exhaust downstream of devices 220 and 222, which can then lead to a single downstream device (not shown). Finally, additional sensors 239 and 241 may also be used downstream of devices 226 and 228, in one example.

Devices 220 and 222 may be various devices as noted herein, for example the may be lean NOx catalysts or SCR catalysts.

Figure 2B:
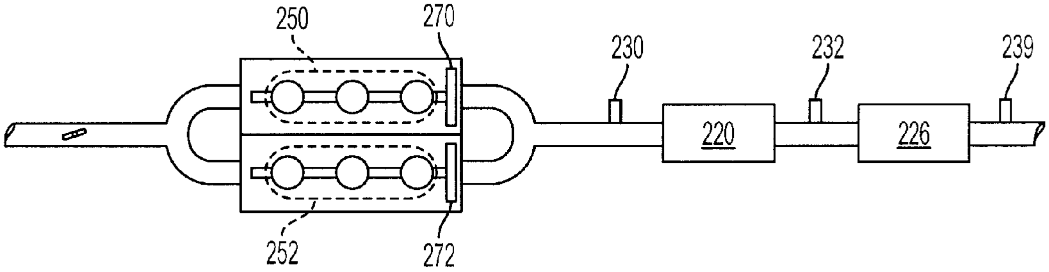

FIG. 2B is similar to that of 2A, except that a Y-pipe configuration is used with devices 220 and 226.

As noted herein, the cylinder groups of the engine may be operated with different valve timing, injection timing, injection amounts, numbers of injections, etc., between cylinder groups to achieve advantageous exhaust temperature control and engine operation. For example, by operating with group 250 having more retarded intake valve closing and/or more advanced exhaust valve opening than group 252, it is possible to operate the engine to achieve improved exhaust heat generation while maintaining acceptable combustion stability (at least one some cylinder) to maintain accurate overall torque control, without significantly increasing throttling losses and with a differential torque production between the cylinders.

In one particular example, rapid heating of an emission control device can be performed when an emission control device is below a desired operating temperature. Specifically, in this approach, the intake valve and/or exhaust valve timing between two cylinders (or two or more cylinder groups) is set differently. In one example, the intake valve closing timing for the first group is set equal to a maximum torque, or best, timing for the current conditions, or to a timing that still provides good combustion for powering and/controlling the engine. Further, the intake valve closing timing for the second group is set equal to a retarded value compared to the timing of the first group.

The amount of valve timing retard for the second group used can vary based on engine operating parameters, such as air-fuel ratio, engine speed, engine load, desired airflow, desired torque, engine coolant temperature, and/or catalyst temperature (i.e., as catalyst temperature rises, less retard in the first and/or second groups, may be desired). Further, the stability limit value can also be a function of these or other parameters.

Also note that the first cylinder group valve timing does not necessarily have to be set to a maximum torque timing. Rather, it can be set to a less retarded value than the second cylinder group. That is, it can be set to a combustion stability spark limit. In this way, the cylinders on the first group operate at a higher torque than they otherwise would if all of the cylinders were producing equal engine output. In other words, to maintain a certain engine output (for example, engine speed, engine torque, etc.) with some cylinders producing more engine output than others, the cylinders operating at the higher engine output produce more engine output than they otherwise would if all cylinders were producing substantially equal engine output.

An advantage to the above aspect is that more heat can be created by operating some of the cylinders at a higher engine load with significantly more valve timing retard than if operating all of the cylinders at substantially the same valve timing retard. Further, by selecting the cylinder groups that operate at the higher load, and the lower load, it is possible to reduce engine vibration. Thus, in one example, the engine starts by firing cylinders from both cylinder groups with substantially equal intake valve closing timing. Then, the timing of the cylinder groups is adjusted differently to provide rapid heating, while at the same time providing good combustion and control.

Also note that the above operation provides heat to both the first and second cylinder groups since the cylinder group operating at a higher load has more heat flux to the catalyst, while the cylinder group operating with more valve timing retard operates at a high temperature.

Also note that all of the cylinders in the first cylinder group do not necessarily operate at exactly the same timing. Rather, there can be small variations (for example, several degrees) to account for cylinder to cylinder variability, in one example. This is also true for all of the cylinders in the second cylinder group. Further, in general, there can be more than two cylinder groups, and the cylinder groups can have only one cylinder.

Further note that, as described above, during operation according to one example embodiment, the injection timing for directly injected fuel can be set at different values, and further the amount of fuel injected and the number of injects can vary between groups. For example, the group with later valve timing may have multiple injections to improve combustion stability. Further, the group with later valve timing may have later fuel injection timing to improve exhaust heat generation, as the late timing in combination with later fuel injection can be used to significantly increase heat generation.

Further details of control routines are included below which can be used with various engine configurations, such as those described in FIGS. 2A-2B. As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

Figure 3:
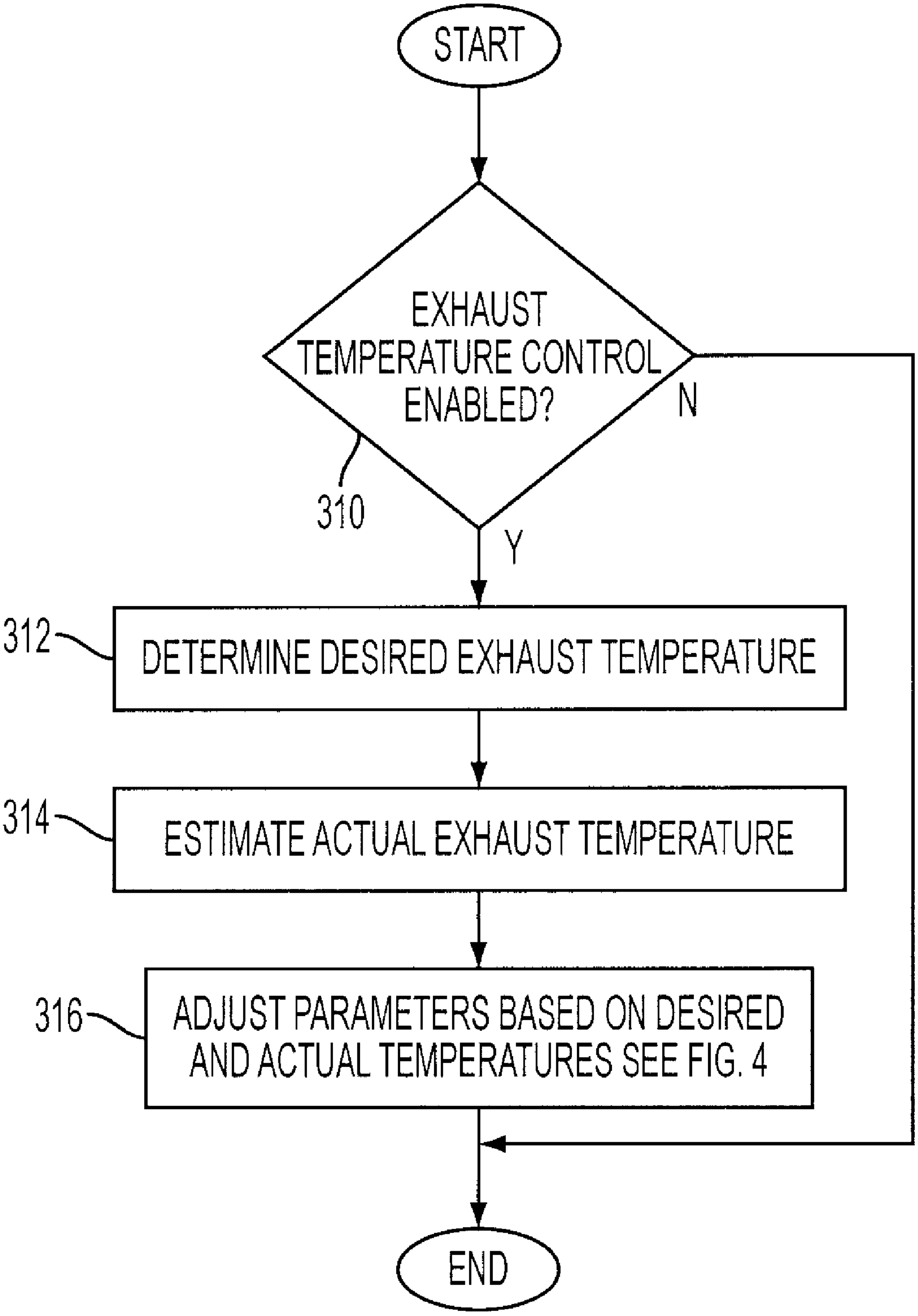
FIGS. 3-4 are high level flow charts showing example routines and methods.

Referring now to FIG. 3, a routine is described for controlling exhaust gas temperature. This example routine can be used during engine operation when it is required to increase exhaust gas temperature to regenerate an emission control device, such as to begin regeneration of a diesel particulate filter. Alternatively, the routine may be used during engine starting when it is required to increase the temperature of an emission control device to achieve improved emission conversion performance. Further still, the routine may be used during engine operation where temperature of an emission control device drops below a minimum operating temperature for acceptable emission performance conversion.

First, in 310, the routine determines whether active exhaust gas temperature control is enabled for the current engine and/or vehicle operating conditions. If so, the routine continues to 312 to determine a desired exhaust gas temperature. The desired exhaust gas temperature may be a desired emission control device temperature to be achieved, or above which the emission control device should operate. Further, there may be multiple desired exhaust gas temperatures for multiple emission control device, where the routine selects a maximum exhaust gas temperature for use as the desired control temperature. Next, in 314 the routine estimates and/or measures actual exhaust gas temperatures or emission control device temperatures. For example, the routine may use a sensor in upstream or downstream of an emission control device to measure emission control device temperature. Likewise, the routine may use an exhaust gas temperature sensor in an exhaust manifold, or in an exhaust pipe, to measure exhaust gas temperature. Further still, the routine may estimate temperatures based on operating conditions such as speed, load, and other parameters. Then, in 316, the routine adjusts engine, transmission, and/or other vehicle operating parameters based on a desired and actual temperatures to achieve desired operation. Additional details of various control actions that can be taken alone or in combination are described further herein with regard to FIG. 4 for example.

Figure 4:
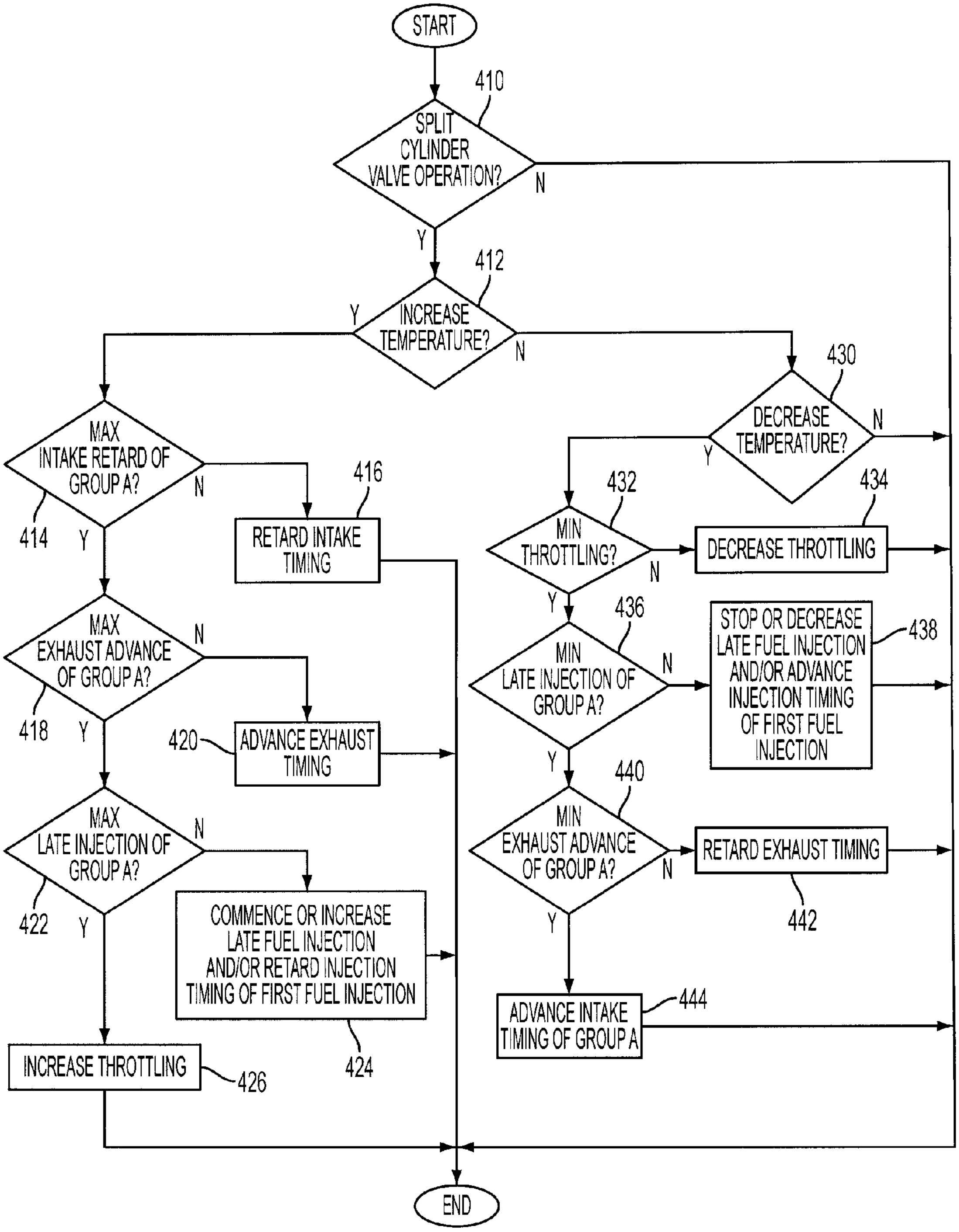

Referring now to specifically FIG. 4, a routine is described for controlling engine operation to maintain an exhaust temperature within a preselected desired range. In on example, the routine forms various adjustments differently in different cylinder groups in order to control exhaust temperature while maintaining desired engine operation. Further, the example routine in FIG. 4 illustrates the sequence of specific adjustments to engine operation, where certain control actions are prioritized over other control actions. In this way, it is possible to provide accurate temperature control and improved engine performance. However, in an alternative embodiment, these specific adjustments and/or order of adjustments may be varied.

First, in 410, the routine determines whether split cylinder valve operation is enabled, or requested. For example, the routine may determine whether operation with a first group of cylinders having a first set of conditions and a second group of cylinders having a second of conditions is requested. In another example, the routine may determine whether operation with a first group of cylinders having a first intake and/or exhaust valve timing, and a second group of cylinders having a second intake and/or exhaust valve timing is requested.

When the answer to 410 is yes, the routine continues to 412 to determine whether it is desired to increase exhaust temperature. If so, the routine continues to 414 to determine whether the intake valve timing of a first group of cylinders (Group A) is at a maximum intake valve timing retard. For example, the routine may determine whether the intake valve timing is retarded past threshold valve timing, where the threshold valve timing may vary with operating conditions such as engine speed and load. If not, the routine continues to 416 to incrementally retard intake valve timing of the cylinders in Group A.

Alternatively, when the answer to 414 is yes, this indicates that the intake valve timing retard is near a maximum allowed value of intake valve timing retard and thus additional and/or alternative adjustments may be used. Specifically, in 418, the routine determines whether the exhaust valve timing of the cylinders of Group A is advanced to a maximum threshold value. Again, the maximum allowed exhaust valve timing advance may be determined or set based on engine operating conditions such as engine speed and/or engine load. If not, the routine continues to 420 to incrementally advance exhaust valve timing of the cylinders in Group A.

Alternatively, when the answer to 418 is yes, this indicates that both the maximum retard of the intake valves and the maximum advance of the exhaust valves of cylinders in Group A have been reached. In this case, the routine continues to 422 to determine whether additional adjustments to the fuel injection may be performed to increase exhaust gas temperature. Specifically in 422, the routine determines whether the maximum amount of weight injection in cylinder Group A has been reached. For example, the routine may determine whether the maximum retard of injection timing of cylinder Group A has been reached, where again the threshold value may vary with conditions such as engine speed and/or engine load. Alternatively, or in addition, the routine may also determine whether a maximum increase in an amount of late injection, or number of injections, has been reached. If not, the routine continues to 424 to adjust the fuel injection of at least the cylinders of Group A. In one approach, the routine may increase an amount of an injection during an exhaust stroke. Further, the routine may commence late injection during the exhaust stroke cylinders in Group A. Further still, the routine may retard injection timing of the fuel injection of cylinders in Group A. Further still, in another example, the routine may retard injection timing of multiple injections in the cylinders of Group A. The routine may also select one or more of the above adjustments to be used in combination during 424.

When the answer to 422 is yes, the routine continues to 426 to increase throttling of the engine via the throttle plate in the intake manifold to increase exhaust temperature.

In this way, it is possible to advantageously utilize a multitude of engine adjustments in a sequential approach to control exhaust gas temperature, while still providing desired engine operating performance.

While both blocks from 414 to 426 illustrate an example approach for increasing exhaust gas temperature, when the answer to 412 is no, the routine continues to 430 to determine whether it is desired to decrease exhaust gas temperature. In this case, the routine utilizes adjustments similar to those described above; however, the reverse order, or sequence, is utilized. Specifically, in 432, the routine determines first whether a minimum throttling in the intake manifold via the throttle plate is present. If not, the routine continues to 434 to decrease throttling.

When the answer to 432 is yes, the routine continues to 436 to determine whether a minimum late injection of cylinders in Group A has been reached. If not, the routine continues to 438 to stop or decrease a late fuel injection amount and/or advance injection timing of the first fuel injection in cylinders of Group A. Again, various adjustments to the number of injections, injection timing, and injection amount of cylinders in Group A may be used such as those described above with regard to 424.

When the answer to 436 is yes, the routine continues to 440 to determine whether a minimum exhaust advance of cylinder group A has been reached. If not, the routine continues to 442 to retard exhaust gas timing of the cylinders in cylinder group A. Alternatively, when the answer to 440 is yes, the routine continues to 444 to advance intake valve timing of cylinders in group A.

In this way, it is possible to advantageously to utilize a variety of exhaust temperature adjustments in a coordinated fashion while providing desired engine performance.

Figure 5:
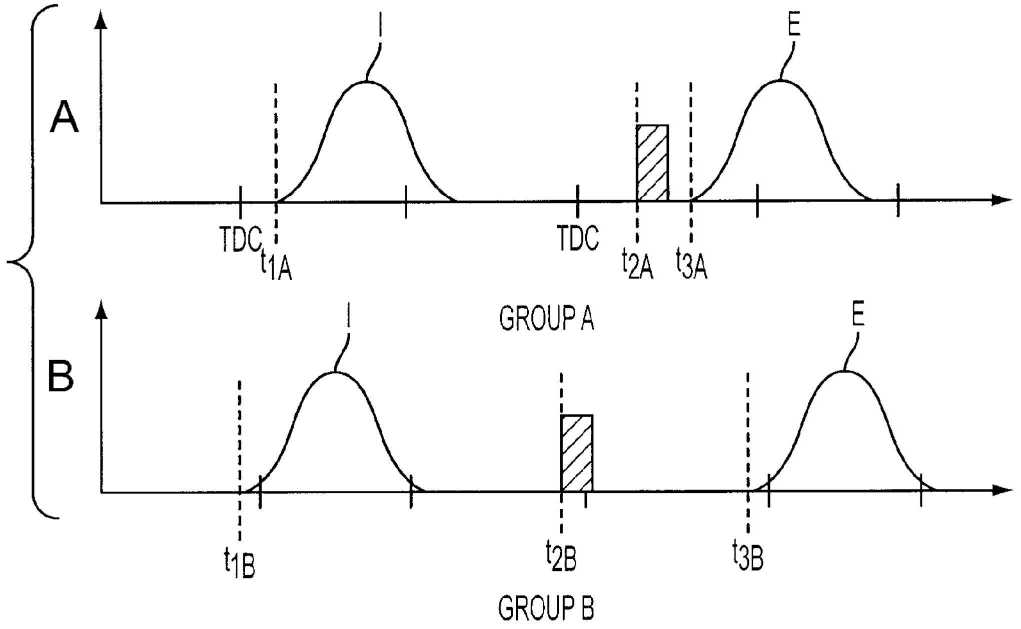
FIGS. 5-6 are graphs illustrating example valve timing and fuel injection timing.
Figure 6:
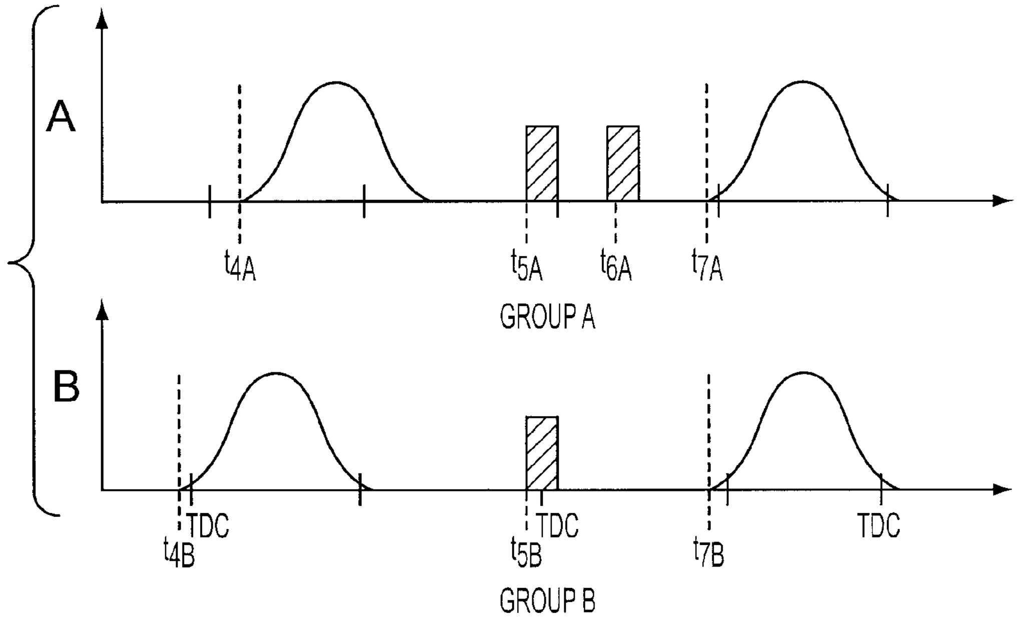

According now to FIGS. 5 and 6, example engine operation is described where the first and second cylinder group (Group A and B) is shown. Specifically, the figures illustrate intake and exhaust valve timing over crankshaft angle, along with fuel injection pulsewidths and timing.

Referring now specifically to FIG. 5, the top graph illustrates performance of cylinders in Group A, while the bottom graph illustrates performance of cylinders in Group B. The intake valve timing profile is labeled I, and the exhaust valve timing profile is labeled E. The hatched pulse(s) illustrate fuel injection. In the example of FIG. 5, cylinders in group A have retarded intake valve opening and closing, advanced exhaust valve opening and closing, and retarded fuel injection timing. Specifically, the cylinders of Group A have intake valve opening timing retarded to time T1A compared with time T1B of cylinder group B. Likewise, the exhaust valve opening timing is advance to T3A compared with T3B of cylinders in Group B. Further still, the start of fuel injection timing is retarded to time T2A compared with time T2B.

Referring now specifically to FIG. 6, a second example operation is illustrated using retarded intake valve opening timing, and a variation in the amount of injection and number of injections between the cylinder groups A and B. In this particular example, the intake valve opening timing of cylinder group A is retarded to time T4A compared with T4B for cylinder group B. Further, a second later injection is performed at time T6A in cylinder group A. In this particular example, the timing of the first injection between the cylinder groups is shown as substantially the same at times T5A and T5B. However, alternate timings may also be used.

In one particular example, the above graphs illustrate how alternate engine operation may be provided to vary exhaust temperature. In the example of FIG. 5, the timing of the fuel injection for cylinder group A (T2A) may be varied earlier and/or later to vary exhaust gas temperature. Likewise, the intake valve opening timing and/or the exhaust valve opening timing (T1A, T3A) may likewise be advanced/retarded to vary exhaust gas temperature. With regard to FIG. 6, both the number and timing of the fuel injections may be varied between the groups to vary exhaust gas temperature. For example, the start of injection timings of cylinder group A (T5A, T6A) may be retarded from the times illustrated in FIG. 6 to further increase exhaust gas temperature. Further, the relative amount of fuel injections between the multiple injections can be varied to vary exhaust gas temperature.

In this way, it is possible to utilize a variety of adjustments in a coordinated approach of FIG. 4 to achieve accurate exhaust gas temperature control and desired engine performance.

The various routines and approaches described herein may be used under various conditions to increase and/or control exhaust and/or emission control device temperature. For example, heating of a device after a cold engine start may be used to improve light-off of the device. Alternatively, temperature control may be used during low load/speed operation to maintain device temperature above a minimum temperature. Further still, split valve timing and different injection timing, amounts, and/or numbers between the cylinder groups can be commenced during the run-up mode or even during engine cranking.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various system and exhaust configurations, fuel vapor purging estimate algorithms, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling operation of a diesel engine having a plurality of cylinders, the engine including a first group of cylinders and a second group of cylinders, the method comprising:

operating the first group of cylinders with a first intake and exhaust valve timing, the first group of cylinders inducting air and performing diesel compression ignition combustion of injected fuel; and operating the second group of cylinders with a second intake and exhaust valve timing, the second group of cylinders inducting air and performing diesel compression ignition combustion of injected fuel, wherein said second intake valve timing is retarded compared to said first intake valve timing or said second exhaust valve timing is advanced compared to said first exhaust valve timing and said second group of cylinders generates reduced torque compared to said first group of cylinders.

2. The method of claim 1 wherein said operation of the first and second group of cylinders is performed to increase exhaust gas temperature.

3. The method of claim 1 wherein an injection timing of said second group of cylinders is retarded compared to an injection timing of said first group of cylinders.

4. The method of claim 1 wherein an injection amount of said first group is increased compared to an injection amount of said second group of cylinders.

5. The method of claim 1 wherein a number of fuel injections in said first group of cylinders is greater than a number of fuel injections in said second group of cylinders.

6. The method of claim 1 wherein said first and second valve timings are adjusted to adjust exhaust temperature.

7. A method for controlling operation of a diesel engine having a plurality of cylinders, the engine including a first cylinder and a second cylinder, the method comprising:

operating at least the first cylinder with a first intake and exhaust valve timing and a first injection timing of at least a fuel injection, the first cylinder inducting air and performing diesel compression ignition combustion of injected fuel; and operating at least the second cylinder with a second intake and exhaust valve timing, and a second injection timing of at least a fuel injection, the second cylinder inducting air and performing diesel compression ignition combustion of injected fuel, where said second intake valve timing is retarded compared to said first intake valve timing or said second exhaust valve timing is advanced compared to said first exhaust valve timing, and where said second injection timing is retarded compared to said first injection timing and said second cylinder generates reduced torque compared to said first cylinder.

8. The method of claim 7 wherein said second cylinder is operated with at least two fuel injections, and timing of each of said two fuel injections is retarded compared to said first injection timing.

9. The method of claim 8 wherein said operation of the first and second cylinders is performed to increase exhaust gas temperature.

10. The method of claim 7 wherein an amount of fuel delivered to the first cylinder is increased compared to fuel delivered to the second cylinder.

11. A method for controlling operation of a diesel engine having a plurality of cylinders, the engine including a first cylinder and a second cylinder, the method comprising:

operating at least the first cylinder with a first intake and exhaust valve timing and a first injection timing of at least a fuel injection, the first cylinder inducting air and performing diesel compression ignition combustion of injected fuel;

operating at least the second cylinder with a second intake and exhaust valve timing, and a second injection timing of at least a fuel injection, the second cylinder inducting air and performing diesel compression ignition combustion of injected fuel, where said second intake valve timing is retarded compared to said first intake valve timing and said second exhaust valve timing is advanced compared to said first exhaust valve timing, and where said second injection timing is retarded compared to said first injection timing; and said operation of the first and second cylinder occurring substantially during a common engine cycle, said second cylinder generating reduced torque compared to said first cylinder.

12. The method of claim 11 wherein said second cylinder is operated with at least two fuel injections, and timing of each of said two fuel injections is retarded compared to said first injection timing.

13. The method of claim 11 wherein said operation of the first and second cylinders is performed to increase exhaust gas temperature.

14. The method of claim 11 wherein an amount of fuel delivered to the first cylinder is increased compared to fuel delivered to the second cylinder.

15. The method of claim 11 wherein timing of combustion is initiated via a first injection of fuel to a cylinder during said diesel combustion.

* * * * *